United States Patent [19]

Grunwald

[11] Patent Number: 4,735,500

[45] Date of Patent: Apr. 5, 1988

[54] OVERHEAD PROJECTOR

[76] Inventor: Peter H. Grunwald, Rheinstrasse 37-39, 6070 Langen, Fed. Rep. of Germany

[21] Appl. No.: 845,570

[22] Filed: Mar. 28, 1986

[30] Foreign Application Priority Data

Apr. 4, 1985 [DE] Fed. Rep. of Germany ....... 3512465

[51] Int. Cl.$^4$ ............................................. G03B 21/16
[52] U.S. Cl. ..................................... 353/61; 353/119; 353/DIG. 4
[58] Field of Search ................... 353/DIG. 4, DIG. 5, 353/DIG. 6, 65, 66, 67, 119, 101

[56] References Cited

U.S. PATENT DOCUMENTS

| | | | |
|---|---|---|---|
| 3,081,670 | 3/1963 | Weisglass | 353/DIG. 3 X |
| 3,459,475 | 8/1969 | Lucas | 353/DIG. 4 |
| 3,472,589 | 10/1969 | Field | 353/DIG. 6 X |
| 3,486,817 | 12/1969 | Hubner | 353/66 X |
| 4,206,984 | 6/1980 | Mueller | 353/61 |
| 4,565,430 | 1/1986 | Grunwald | 353/61 |

FOREIGN PATENT DOCUMENTS 990930 5/1965 United Kingdom ......... 353/DIG. 3

Primary Examiner—Harry N. Haroian
Attorney, Agent, or Firm—Robert E. Burns; Emmanuel J. Lobato

[57] ABSTRACT

An overhead projector comprises a flat base accommodating a reflective Fresnel lens below a writing surface. A hollow arm projecting up from one side of the base supports a projection head comprising a light source, an objective lens assembly spaced horizontally from the light source, a first deflection mirror for directing rays from the light source down onto the writing surface and reflective Fresnel lens and a second deflective lens for directing rays from the writing surface and reflective Fresnel lens out through the objective lens assembly. The objective lens assembly is tiltable to direct light rays on an upwardly inclined path and the second deflection mirror is also tiltable and is coupled with the objective lens assembly so as to be tilted half as much as the objective lens assembly.

6 Claims, 4 Drawing Sheets

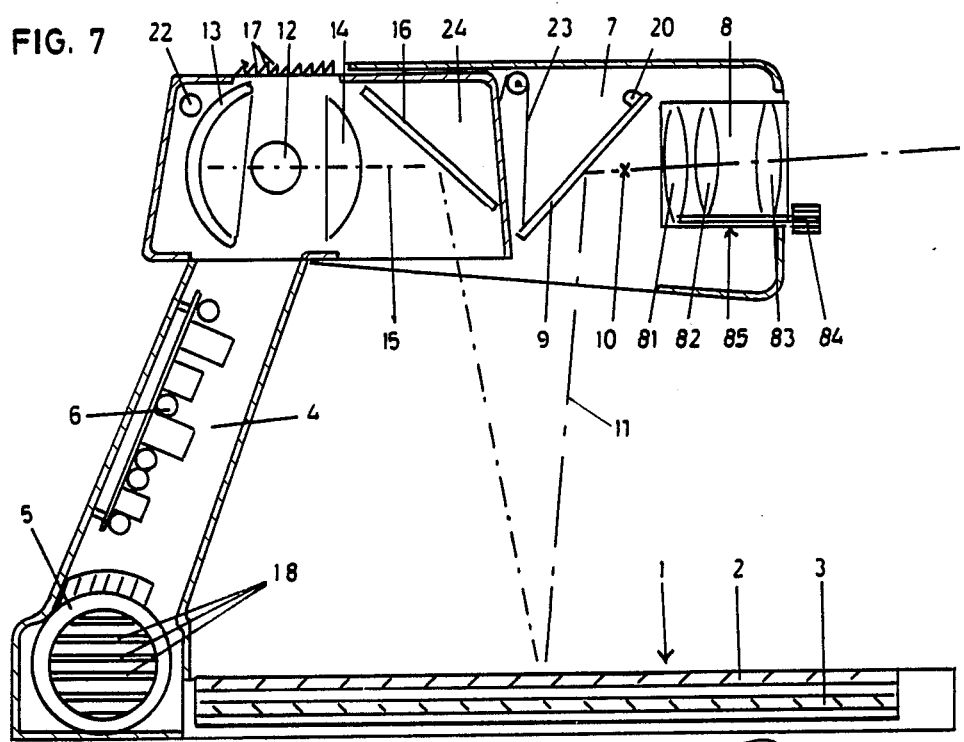
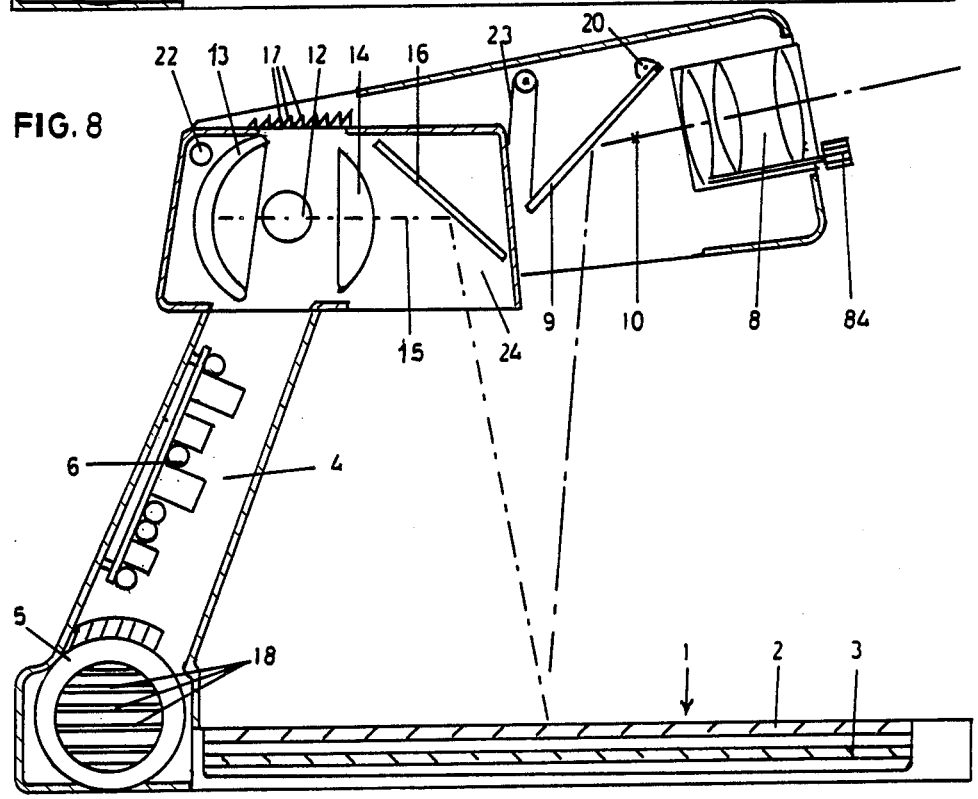

OVERHEAD PROJECTOR

FIELD OF INVENTION

The invention relates to an overhead projector comprising a base plate accommodating the writing plate and a reflective Fresnel lens, a projection head accommodating an objective lens and a deflection mirror and a light source composed of a lamp reflector and condenser lens which is accommodated in the part of the projection head turned toward the support arm whereby the deflection mirrors is arranged between the Fresnel lens and the objective.

BACKGROUND OF THE INVENTION

Overhead projectors of this kind are known. They are distinguished by their very flat base plate from another design of overhead projectors in which the light source is arranged in a large square casing underneath the transparent writing plate and the Fresnel lens. By virtue of the small base plate, the overhead projector can be placed on a table and operated by a speaker seated at the table which is not the case with the other type of overhead projectors with the lamp arranged underneath the writing plate and Fresnel lens.

In the first mentioned type of overhead projector in which the lamp is arranged above the writing plate and a reflective Fresnel lens, it is customary for the objective lens to be arranged with a vertical axis and for a deflection mirror to be arranged above the objective. Another type of overhead projector has the century old arrangement that the optical axis of the objective is almost horixontal and the deflection mirror is arranged on the side of the objective which is associated with the path of rays of the Fresnel lens.

In particular, when the overhead projector is used to project a picture of the original on a projection surface which has a height between 1 mm and 3 mm, the projection head with the support arm of the overhead projector appears disturbingly in the field of view of the spectators. This disturbance has heretofore been accepted because one would not allow too great a picture distortion and light strength difference in the projected picture. With a projection head arranged lower, it is namely necessary to tilt the deflection mirror so that the deflection of the optical path of rays does not lie in the vicinity of 90°, but greatly exceeds the optimal angle of 90°. However, the arrangement of the projection head high above the writing surface is objectionable not only because of being in the field of view of spectators, but also by reason of requiring a very long support stem which because of its great length is inconvenient for transport and by reason of its great length must be very stiff so that the projection head during the projection does not get into oscillation or otherwise wobble.

SUMMARY OF THE INVENTION

The invention eliminates these objections. It is an object of the invention to provide an overhead projector of the first mentioned type with a lower height of the projection head and thereby a lower over-all height which is in the position to project images of original copies with only limited distortion on a vertical wall surface although the deflection angle greatly exceeds 90°.

The invention can be realized in two manners.

One possibility of realizing the invention consist in that the objective is arranged tiltable about a horizontal axis and lockable in the projection head, that the deflection mirror is likewise arranged tiltable about a horizontal axis in the projection head and is coupled with the objective in the manner that upon tilting of the objective through a given angle, the deflection mirror is tilted through a smaller angle, that the objective has a focal point which lies either in the objective or between the deflection mirror and the objective, and that the the objective comprises at least two lenses or lens groups of which foremost is arranged slidable and lockable in the objective tube.

The other possibility of realizing the invention consist therein that the objective is arranged in a tiltable projection head, that the deflection mirror tiltably arranged in the projection head is coupled therewith so that upon tilting of the projection head, the deflection mirror is tilted at a smaller angle, that the objective has a focal point which lies either in the objective or between the deflection mirror and the objective whereby the objective consists of at least two lenses or lens groups of which the foremost is arranged slidably and lockably in the objective tube, and that the lamp with the reflector and condenser are accommodated in a special housing independent from the tilt position of the projection head which does not change its position with respect to the support arm during the projection.

Both possibilities permit the projection head to be arranged low so that it is out of the viewing angle of the spectators or is merely in the lower edge of this viewing angle. Thereby both possibilities offer a substantially distortion-free picture that is uniformly illuminated. This picture is not, or is very little, trapezoidal in contrast to pictures which with known overhead projectors are produced with a tilting of the light beam far over 90°. Thus through the invention, the requirements of the "Scheimpflugschen" rule are satisfied.

The low height of the projection head naturally gives rise to difficulties in the illuminating of the writing surface above the mirrowed Fresnel lens when the arrangement of the light source is effected in usual manner.

For the radiation angle must then be very wide which has the result that the central portion of the picture is illuminated considerably better than the edge. In accordance with the invention, this objection is thereby avoided that the optical axis of the lamp reflector and of the condenser run almost horizontally and that in the optical path of the light between the condenser and the Fresnel lens, a deflection mirror is arranged. The optical distance of the lamp from the writing surface is thereby enlarged and the radiation angle is correspondingly reduced. In this way, the illumination of the writing surface is considerably improved.

It is advantageous when the lamp in the projection head is arranged in an extension of the support arm. That has the advantage that the lamp on the one hand is optically removed as far as possible from the writing surface and on the other hand, the advantage of better cooling when the support arm is used as the cooling member with a chimney effect.

It is especially advantageous when in or under the support arm a blower is arranged which, with the accommodation of the power supply inside the support arm, the power supply first and finally the lamp, the reflector and eventually the condenser are cooled.

For the accommodation of adjustment mechanism for the deflection mirror and/or the lens groups arranged movably in the objective tube, it is advantageous when the lenses of the objective and/or the objective holder has an octagonal form while the projection head has more of a square form Advantageously, the mechanism with which the deflection mirror simultaneously with the objective and/or the projection head is tilted is so selected that the tilt angle of the deflection mirror is half the tilting of the objective or the projection head. With the second embodiment of the invention, it is advantageous when the lamp housing is embraced by the projection head housing. That brings a series of advantages as, for example, a simplier support of the projection head housing, an additional protection for the lamp housing, protection from contact with the hot lamp housing and still others.

BRIEF DESCRIPTION OF DRAWINGS

The nature and advantages of the invention will be understood from the following description of embodiments shown by way of example schematically in the accompanying drawings in which:

FIG. 7 is a schematic vertical section in one position of the projection head and, FIG. 8 is a schematic vertical section in another position of the projection head.

DESCRIPTION OF PREFERRED EMBODIMENTS

Figure 1:
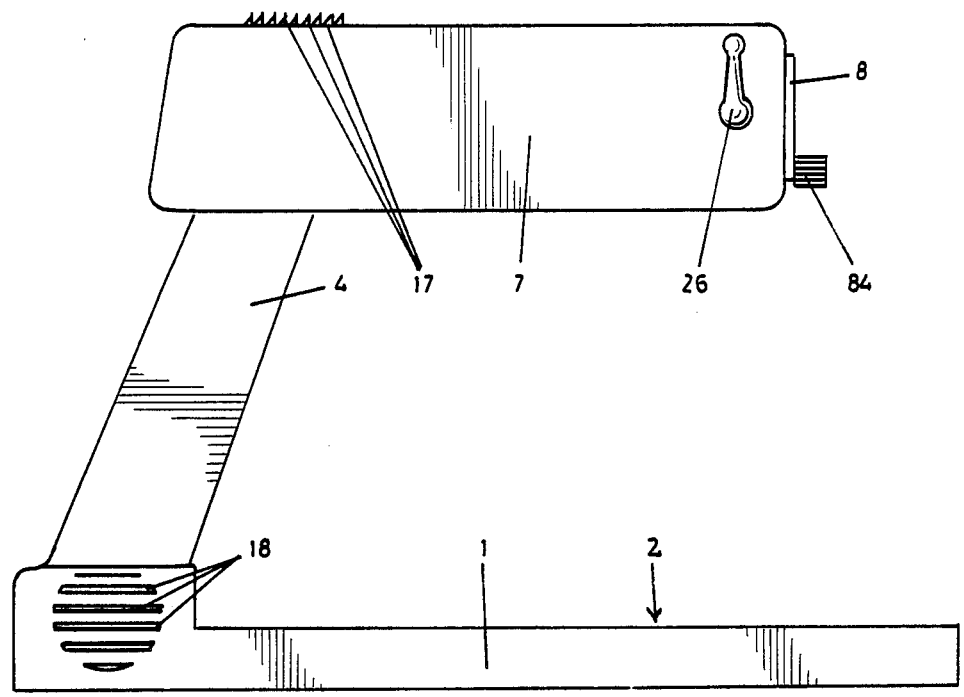
FIG. 1 is a side elevation of an overhead projector in accordance with the present invention.

The overhead projector comprises a base plate 1 in which a writing plate 2 is set in under which there is a Fresnel lens 3 which has a reflective upper surface. On the base plate 1, there is mounted a support arm 4 which is hollow and accommodates a blower 5 and an electronic power supply 6. The support arm 4 carries a projection head 7 in which an objective lens 8 and a deflection mirror 9 are arranged. The focal point of the objective 8 lies between the objective 8 and the deflection mirror 9. The deflection mirror 9 is arranged between the objective 8 and the Fresnel lens in the optical path of rays 11.

Also, the light source comprising a lamp 12, reflector 13 and condenser 14 is arranged in the projection head 7. Thereby is the arrangement such that the central line 15 of the optical path of rays of the light source inside the projection head runs approximately horizontally. So that the light can fall on the writing plate 2, there is arranged in this path of rays a further deflection mirror 16 which deflects the light coming from the light source 12, 13,14 downwardly and lets it fall on the writing plate. The lamp 12 of the light source lies in an extension of the support arm 4 and is thereby cooled by the cool air which from the blower 5 flows in the interior of the support arm 4 over the power supply 6 and on the lamp 12 together with the reflector 13 and the lamp side surface of condenser 14 and finally is exhausted through the outlet openings 17. Fresh air enters the blower 5 through the air inlet openings 18 and is forwarded under pressure through the interior of the support arm 4,which works like a chimney.

The objective 8 is tiltable about a horizontal tilt axis 19. The deflection mirror 9 is tiltable about a tilt axis 20. The two components namely the objective 8 and the deflection mirror 9 are connected with one another through at least one lever of a coupling mechanism 21 which is so constructed that upon tilting of the objective 8 about the tilt axis 19 through a given angle,the deflection mirror 9 is likewise tilted and indeed through a smaller angle,preferably half the angle through which the objective 19 is tilted. If the back side of the objective 8 facing the mirror 8 is tilted in a downward direction, the underside of the mirror 9 is tilted away from the objective 8.

Tilting the objective 8 and hence of the mirror 9 is effected by means of a lever 26 on the one end of a shaft that constitutes the tilt axis 19 of the objective. The opposite end of the shaft is threaded to receive a threaded knob 27 which is loosened to permit tilting of the objective 8 and tightened to hold the objective in selected tilted position.

The objective 8 comprises two lens groups or lenses. The lens 83 turned toward the projection wall is arranged fast in the objective 8 while two lenses 81, 82 which are turned toward the deflection mirror 9 are slidably in the objective tube 85 by means of an adjustment screw 84. The adjustment of these two lenses 81, 82 serves to sharp focus the picture. The displacement need be only limited for example, 10-20 mm.

Figure 2:
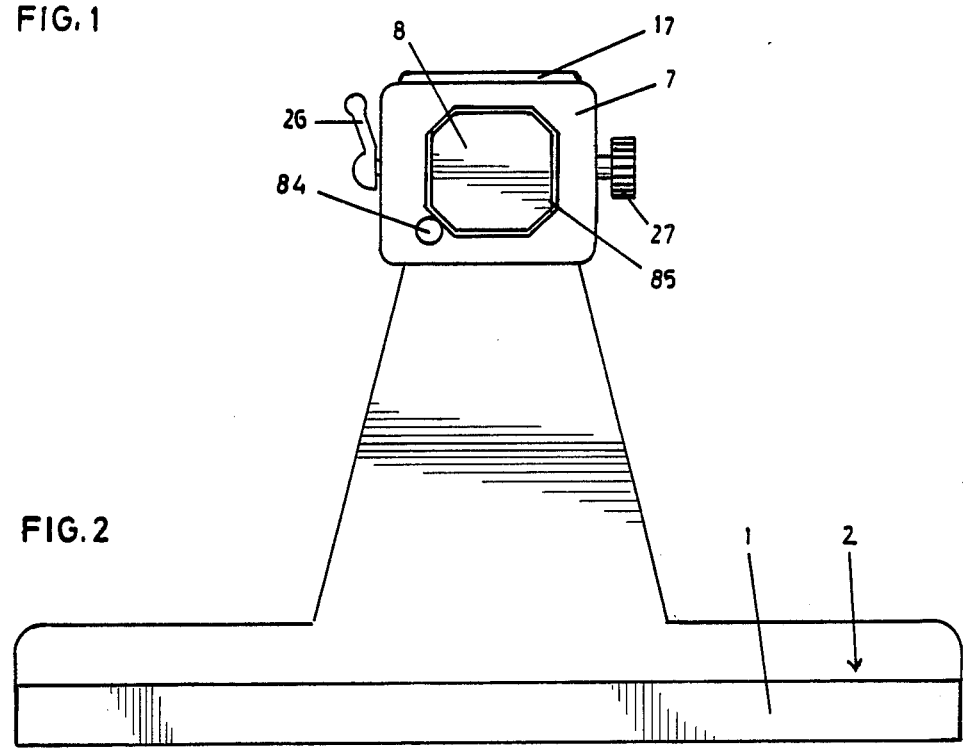
FIG. 2 is a front elevation.
Figure 3:
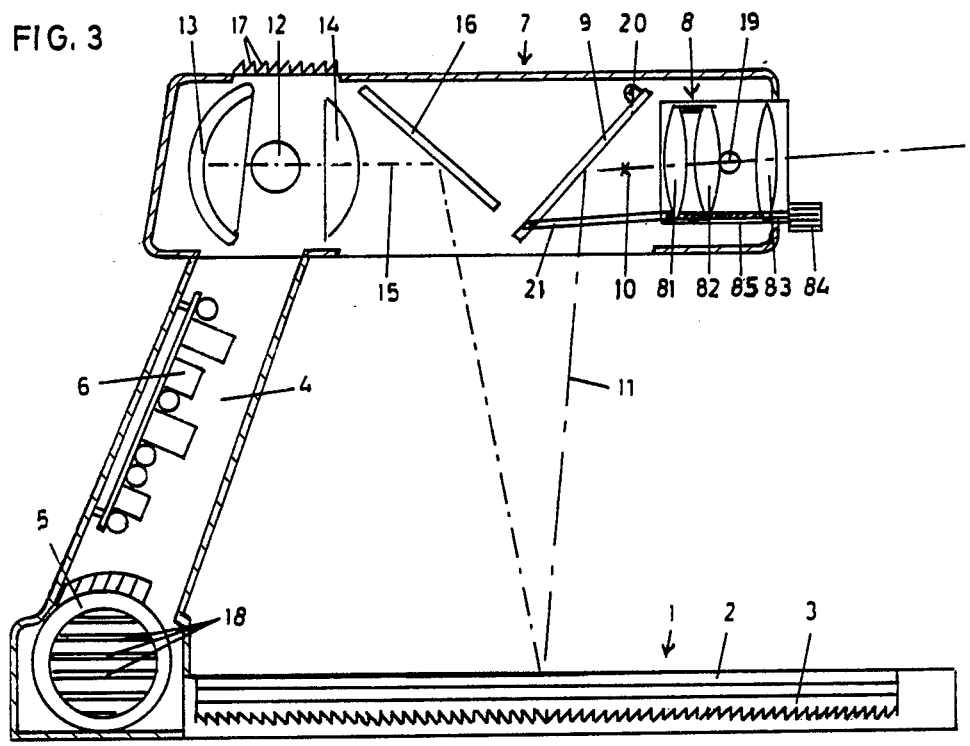
FIG. 3 is a schematic vertical section.
Figure 4:
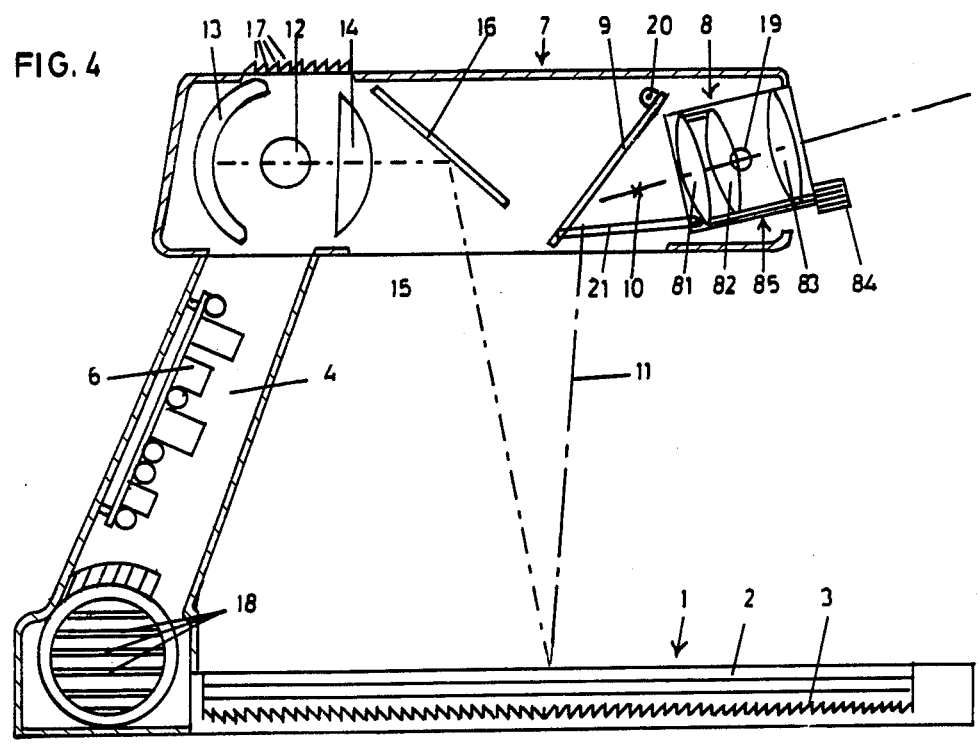
FIG. 4 is a schematic vertical section with a different angle of tilt of the objective.
Figure 5:
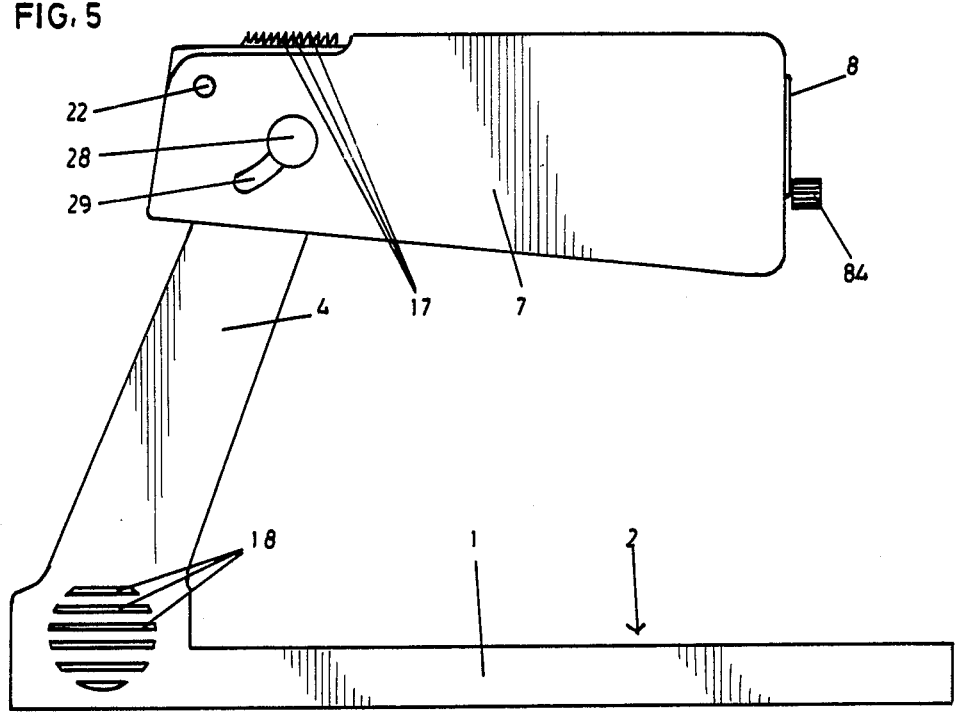
FIG. 5 is a side elevation of another embodiment.
Figure 6:
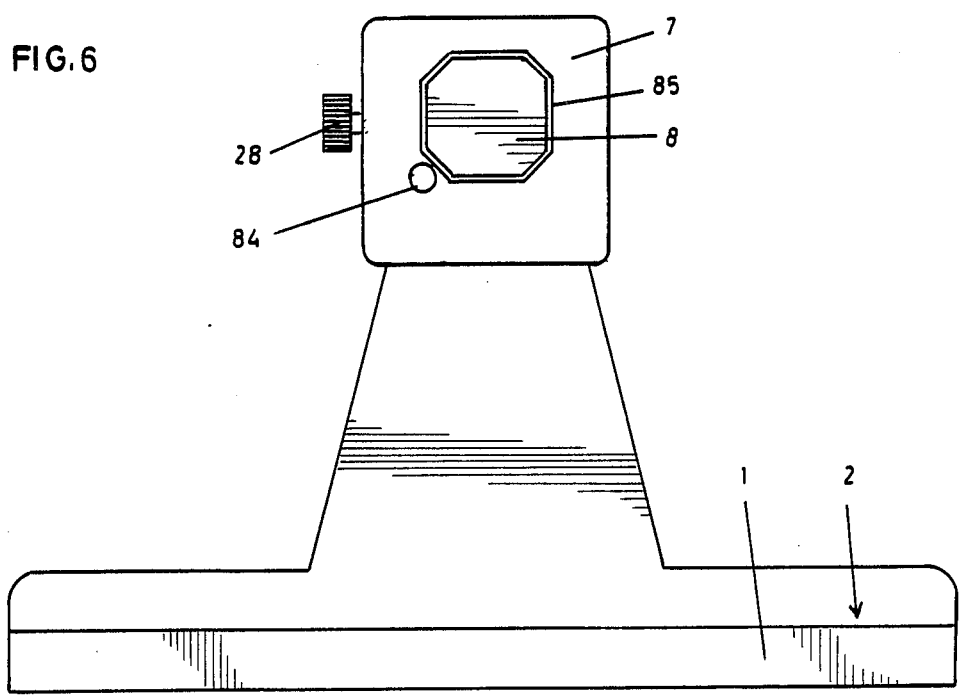
FIG. 6 is a front elevation.

The embodiment of the invention illustrated in FIGS. 5-8 differs from that of the enbodiment of FIGS. 1-2 in that the objective 8 is installed fast in the projection head 7 which is tiltable about a tilt axis 22 relative to a fixed housing 24 which houses the light source. A link 23 of a coupling mechanism connects the deflection mirror 9 with a light source housing 24 mounted fast on the support arm 4. The link 23 is shown in the form of a cable attached to the lower part of the deflection mirror 9 and passing over a pulley mounted rotatably on the projection head 7, the other end of the cable being attached to the light source housing 24. The coupling is such that as the projection head 7 is tilted about the axis 22, the deflection mirror 9 is tilted relative to the projection head 7 so that in all angular positions of the projection head, light from the writing plate 2 is directed through the objective 8. The stationary light source housing 24 is partially embraced by the projection head 7.

Tilting of the projection housing 7 to the desired angle is effected manually. The housing 7 is secured in selected tilted position by means of a threaded knob 28 screwed on the end of a threaded stub shaft which projects from a side of the light source housing 24 through an arcuate slot 29 in a side of the housing 7. The knob 28 is loosened to permit tilting of the housing 7 manually to the desired angle and then tightened to lock the housing 7 in selected tilted position.

The objective 8 is constructed in the following manner:

the objective for the A4-projector has a focal length f=285 mm to 315 nm. The objective for the A5 projector has a focal length f=270 mm to 295 mm.

The kind of glass is identical for both objectives. The picture side lens is of BK7, the middle lens is of LLF7 and the front side lens is of BaK4. All designations are Schott-Meinz designations.

What I claim is:

1. An overhead projector comprising a flat base, a reflective Fresnel lens with an overlying writing surface in said base, a hollow support arm extending up from one side of said base, a projection head supported by said support arm and overlying said base, said projection head comprising a stationary first housing mounted on said support arm and a second housing partially embracing said first housing and extending forwardly thereof, means tiltably mounting said second housing on said first housing for tilting about a horizontal transverse tilt axis relative to said first housing, a lamp in a rear portion of said first housing over said hollow support arm, a first deflection mirror mounted in a forward portion of said first housing at an angle to the horizontal to direct light from said lamp down to said writing surface and reflective Fresnel lens in said base, an objective lens assembly in a forward portion of said second housing and a second deflection mirror tiltably mounted in said second housing rearwardly of said objective lens assembly for tilting about a horizontal transverse axis relative to said second housing, said second deflection mirror being inclined at an angle to the horizontal to direct liqht from said writing surface and reflective Fresnel lens to and through said objective lens assembly, and means coupling said second deflection mirror with said first housing to tilt said second deflection mirror relative to said second housing when said second houring is tilted relative to said first housing, said second housing being tiltable about an axis in an upper rear part of said first housing an having side portions and an upper portion embracing said first housing.

2. An overhead projector comprising a flat base, a reflective Fresnel lens with an overlying writing surface in said base, a hollow support arm extending up from one side of said base, a projection head supported by said support arm and overlying said base, said projection head comprising a stationary first housing mounted on said support arm and a second housing partially embracing said first housing and extending forwardly thereof, means tiltably mounting said second housing on said first housing for tilting about a horizontal transverse tilt axis relative to said first housing, a lamp in a rear portion of said first housing over said hollow support arm, a first deflection mirror mounted in a forward portion of said first housing at an angle to the horizontal to direct light from said lamp down to said writing surface and reflective Fresnel lins in said base, an objective lens assembly in a forward portion of said second housing and a second deflection mirror tiltably mounted in said second housing rearwardly of said objective lens assembly for tilting about a horizontal transverse axis relative to said second housing, said second deflection mirror being inclined at an angle to the horizontal to direct light from said writing surface and reflective Fresnel lens to and through said objective lens assembly, and means coupling said second deflection mirror with said first housing to tilt said second deflection mirror relative to said second housing when said second housing is tilted relative to said first housing, the angle through which said second deflection mirror is tilted being approximately half that through which said second housing is tilted.

3. An overhead projector according to claim 2, in which said hollow support arm opens into said first housing, and in which blowing means in said hollow support arm delivers a stream of air from said hollow support arm into said first housing, said lamp being positioned above an upper end of said hollow support arm in position to be cooled by said air stream.

4. An overhead projector according to claim 3, in which said flowing means is located at the base of said support arm and in which electrical elements of said projector are mounted in said hollow support arm in position to be cooled by air flow from said blowing means.

5. An overhead projector according to claim 2, in which said objective lens assembly comprises an objective tube which is mounted stationary in said second housing and a plurality of lenses in said tube, at least one of said lenses being movable axially relative to said tube and provided with means for moving it to selected position.

6. An overhead projector comprising a flat base, a reflective Fresnel lens with an overlying writing surface in said base, a hollow support arm extending up from one side of said base, a blower at the base of said hollow support arm for directing a stream of air upwardly in said hollow support arm, a projection head comprising an elongate housing mounted horizontally on an upper end of said hollow support arm, for directing a stream of air upwardly in said hollow support arm, a projection head comprising an elongate housing mounted horizontally on an upper end of said hollow support arm, a lamp in said housing over an upper end of said hollow support arm in position to receive and be colled by air from said hollow support arm, a first deflection mirror mounted in said housing forwardly of said lamp and inclined to the horizontal to direct light from said lamp down to said writing surface and reflective Fresnel lens, an objective lens assembly disposed forwardly of said first deflection mirror, said objective lens assembly comprising an objective tube, a plurality of lenses in said tube, at least one of said lenses being movable axially of said tube and means for moving said movable lens to selected positions, means for mounting said objective lens assembly in said housing for tilting about a horizontal transverse tilt axis, a second deflection mirror disposed between said objective lens assembly and said first reflection mirror and inclined to the horizontal to direct light from said writing surface and reflective Fresnel lens to and through said objective lens assembly, means mounting said second deflection miror in said housing for tilting about a tilt axis parallel to the tilt axis of said objective lens assembly, means for tilting said objective lens assembly and for securing said objective lens assembly in selected tilted position and means interconnecting said second deflection mirror and said objective lens assembly for simultaneously tilting said second deflection mirror through an angle less than that through which said objective lens assembly is tilted, said interconnecting means comprising a link interconnecting said second deflection mirror with said objective tube, said link being connected to said second deflection mirror at a distance from the tilt axis of said second deflection mirror which is approximately twice the distance between a point of connection of said link to said objective tube, said tilt axis of said objective lens assembly.

* * * * *